United States Patent
Lai

(10) Patent No.: US 12,229,325 B2
(45) Date of Patent: Feb. 18, 2025

(54) MICROCONTROLLER, PROTECTION CIRCUIT, AND PROTECTION METHOD CAPABLE OF AVOIDING INTERFERENCE FROM SUDDEN EVENTS

(71) Applicant: Nuvoton Technology Corporation, Hsinchu (TW)

(72) Inventor: Yun-Kai Lai, Hsinchu (TW)

(73) Assignee: NUVOTON TECHNOLOGY CORPORATION, Hsinchu Science Park (TW)

(*) Notice: Subject to any disclaimer, the term of this patent is extended or adjusted under 35 U.S.C. 154(b) by 340 days.

(21) Appl. No.: 17/828,812

(22) Filed: May 31, 2022

(65) Prior Publication Data

US 2022/0414269 A1    Dec. 29, 2022

(30) Foreign Application Priority Data

Jun. 25, 2021    (TW) ................................ 110123306

(51) Int. Cl.
*G06F 21/76*      (2013.01)
*G06F 13/24*      (2006.01)

(52) U.S. Cl.
CPC .............. *G06F 21/76* (2013.01); *G06F 13/24* (2013.01)

(58) Field of Classification Search
CPC .......... G06F 21/76; G06F 13/24; G06F 13/26; G06F 13/28
See application file for complete search history.

(56) References Cited

U.S. PATENT DOCUMENTS

| | | | | |
|---|---|---|---|---|
| 4,404,627 A * | 9/1983 | Marcantonio | ........... | G06F 13/24 710/268 |
| 4,572,048 A * | 2/1986 | Franz | ....................... | G10H 1/06 84/622 |
| 2004/0006486 A1* | 1/2004 | Schmidt | ................. | G06Q 30/06 726/6 |
| 2007/0200712 A1* | 8/2007 | Arneson | ............ | G06K 7/10316 340/572.7 |

(Continued)

FOREIGN PATENT DOCUMENTS

CN            109074336 A     *   12/2018          G06F 13/14

*Primary Examiner* — John B King
(74) *Attorney, Agent, or Firm* — MUNCY, GEISSLER, OLDS & LOWE, P.C.

(57) ABSTRACT

A microcontroller includes an event-detection circuit, a protection-control circuit, a digital-to-analog converter, a digital-to-analog conversion interface controller, a trigger-event controller, and a central processing unit. The event-detection circuit detects a sudden event, and correspondingly outputs an interrupt notification and a protection-enable signal. The protection-control circuit receives the protection-enable signal, and correspondingly outputs a protection-execution signal. The digital-to-analog conversion interface controller receives the protection-execution signal, stops updating the received input data, and stops outputting the acknowledgement signal. The trigger-event controller determines whether to set the conversion parameters of the digital-to-analog conversion interface controller according to the acknowledgement signal. The central processing unit determines and outputs the conversion parameters to the trigger-event controller, and receives the interrupt notification to eliminate the sudden event.

20 Claims, 3 Drawing Sheets

(56) References Cited

U.S. PATENT DOCUMENTS

| | | | |
|---|---|---|---|
| 2009/0304130 A1* | 12/2009 | Umari | H03G 3/3089 |
| | | | 375/345 |
| 2018/0248465 A1* | 8/2018 | Higashi | H02M 3/158 |
| 2019/0013923 A1* | 1/2019 | Liu | H04L 5/14 |
| 2021/0004339 A1* | 1/2021 | Trivedi | G06F 13/28 |
| 2021/0078334 A1* | 3/2021 | Gardner | B33Y 50/00 |
| 2022/0001673 A1* | 1/2022 | Anderson | B41J 2/17546 |
| 2022/0190838 A1* | 6/2022 | Horn | H04L 1/0009 |
| 2022/0353185 A1* | 11/2022 | Emerson | H04L 47/122 |
| 2023/0370182 A1* | 11/2023 | Kim | H04B 17/318 |
| 2024/0080820 A1* | 3/2024 | Zhang | H04L 5/0053 |

\* cited by examiner

MICROCONTROLLER, PROTECTION CIRCUIT, AND PROTECTION METHOD CAPABLE OF AVOIDING INTERFERENCE FROM SUDDEN EVENTS

CROSS REFERENCE TO RELATED APPLICATIONS

This application claims priority of and the benefit of Taiwan Application No. 110123306, filed on Jun. 25, 2021, the entirety of which is incorporated by reference herein.

FIELD OF THE DISCLOSURE

The present invention is related to an electronic device, and in particular it is related to a microcontroller, a protection circuit, and a protection method that can prevent interference caused by sudden events.

DESCRIPTION OF THE RELATED ART

In existing technology, when an unexpected event occurs in the usage environment of a microcontroller, this may cause the digital-to-analog converter inside the microcontroller to terminate unexpectedly, causing the output voltage to be abnormal. For applications that need to use the output voltage of the digital-to-analog converter as a working voltage reference or which use the output waveform of the digital-to-analog converter for control, there will be unexpected output breakpoints. When this unexpected output voltage from the digital-to-analog converter is output to the back-end load, there will be safety considerations and risk to system applications.

BRIEF SUMMARY OF THE DISCLOSURE

In order to resolve the issue described above, the present invention provides a microcontroller. The microcontroller includes an event-detection circuit, a protection-control circuit, a digital-to-analog converter, a digital-to-analog conversion interface controller, a trigger-event controller, and a central processing unit. The event-detection circuit detects a sudden event, and correspondingly outputs an interrupt notification and a protection-enable signal according to the sudden event. The protection-control circuit receives the protection-enable signal, and correspondingly outputs a protection-execution signal. The digital-to-analog conversion interface controller receives the protection-execution signal, stops updating the received input data, and stops outputting the acknowledgement signal, so that the digital-to-analog converter suspends the signal conversion. The trigger-event controller determines whether to set the conversion parameters of the digital-to-analog conversion interface controller according to the acknowledgement signal. The central processing unit determines the conversion parameters, outputs the conversion parameters to the trigger-event controller, and receives the interrupt notification to eliminate the sudden event.

According to the microcontroller above, the microcontroller further includes a memory and a direct memory access controller. The direct memory access controller reads the required input data from the memory, and outputs the required input data to the digital-to-analog conversion interface controller. When the protection-control circuit receives the protection-enable signal, the protection-control circuit outputs a control signal to the direct memory access controller, so that the direct memory access controller suspends the transfer of the required input data from the memory to the digital-to-analog conversion interface controller.

According to the microcontroller above, the central processing unit eliminates the sudden event, including: resolving the sudden event and clearing the interrupt notification; or determining that the sudden event has been eliminated directly after a preset time has elapsed.

According to the microcontroller above, when the event-detection circuit detects that the sudden event has been resolved, the event-detection circuit correspondingly outputs a protection-disable signal to the protection-control circuit.

According to the microcontroller above, when the protection-control circuit receives the protection-disable signal, and the central processing unit has eliminated the sudden event, the protection-control circuit correspondingly outputs a protection-stop signal to the digital-to-analog conversion interface controller, and correspondingly outputs an inverted control signal to the direct memory access controller, so that the digital-to-analog conversion interface controller and the direct memory access controller are restored to normal operation.

According to the microcontroller above, when the central processing unit receives the protection-execution signal from the protection-control circuit, and the automatic switching function of the central processing unit corresponding to the conversion parameters is turned on, the central processing unit outputs the conversion parameters to the trigger-event controller.

According to the microcontroller above, the conversion parameters include the trigger period of the trigger event of the peripheral circuit.

According to the microcontroller above, the digital-to-analog conversion interface controller stops updating the received input data, including: storing the last input data before receiving the protection-execution signal; recording the interface signal before receiving the protection-execution signal; and not receiving the acknowledgement signal by the trigger-event controller to enable the trigger-event controller not to output a trigger signal to the digital-to-analog conversion interface controller.

The present invention also provides a protection circuit to protect a digital-to-analog converter from interference from a sudden event. The protection circuit includes a protection-control circuit, a digital-to-analog conversion interface controller, a trigger-event controller, and a central processing unit. The protection-control circuit receives a protection-enable signal associated with the sudden event, and correspondingly outputs a protection-execution signal. The digital-to-analog conversion interface controller receives the protection-execution signal, stops updating the received input data, stops outputting the acknowledgement signal, and enables the analog-to-digital convertor to suspend the signal conversion. The trigger-event controller determines whether to set the conversion parameters of the digital-to-analog conversion interface controller according to the acknowledgement signal. The central processing unit determines the conversion parameters, outputs the conversion parameters to the trigger-event controller, and eliminates the sudden event.

According to the protection circuit above, when the protection-control circuit receives the protection-enable signal, the protection-control circuit outputs a control signal to a direct memory access controller, so that the direct memory access controller suspends the transfer of the required input data from a memory to the digital-to-analog conversion interface controller.

According to the protection circuit above, the central processing unit eliminates the sudden event, including: resolving the sudden event and clearing an interrupt notification associated with the sudden event; or determining that the sudden event has been eliminated directly after a preset time has elapsed.

According to the protection circuit above, when the protection-control circuit receives a protection-disable signal associated with the sudden event that has been resolved, and the central processing unit has eliminated the sudden event, the protection-control circuit correspondingly outputs a protection-stop signal to the digital-to-analog conversion interface controller, and correspondingly outputs an inverted control signal to the direct memory access controller, so that the digital-to-analog conversion interface controller and the direct memory access controller are restored to normal operation.

According to the protection circuit above, when the central processing unit receives the protection-execution signal from the protection-control circuit, and the automatic switching function of the central processing unit corresponding to the conversion parameters is turned on, the central processing unit outputs the conversion parameters to the trigger-event controller.

According to the protection circuit above, the conversion parameters include the trigger period of the trigger event of the peripheral circuit.

According to the protection circuit above, the digital-to-analog conversion interface controller stops updating the received input data, including: storing the last input data before receiving the protection-execution signal; recording the interface signal before receiving the protection-execution signal; and not receiving the acknowledgement signal by the trigger-event controller to enable the trigger-event controller not to output a trigger signal to the digital-to-analog conversion interface controller.

The present invention also provides a protection method for a digital-to-analog converter. The protection method is suitable for a microcontroller having an event-detection circuit, a protection-control circuit, a digital-to-analog conversion interface controller, a digital-to-analog converter, a trigger-event controller, and a central processing unit. The protection method includes detecting a sudden event, and correspondingly outputting an interrupt notification and a protection-enable signal according to the sudden event; receiving the protection-enable signal, and correspondingly outputting a protection-execution signal; receiving the protection-execution signal, stopping the update of the received input data, stopping the output of the acknowledgement signal, and enabling the digital-to-analog converter to suspend the signal conversion; determining and outputting the conversion parameters of the digital-to-analog conversion interface controller, and receiving the interrupt notification to eliminate the sudden event; and determining whether to set the conversion parameters according to the acknowledgement signal.

According to the protection method above, when the protection-enable signal is received, the transfer of the required input data from a memory to the digital-to-analog conversion interface controller is suspended.

According to the protection method above, eliminating the sudden event includes: resolving the sudden event and clearing the interrupt notification; or determining that the sudden event has been eliminated directly after a preset time has elapsed.

According to the protection method above, when the protection-execution signal is received, and the automatic switching function of the central processing unit corresponding to the conversion parameters is turned on, the conversion parameters are output to the trigger-event controller.

According to the protection method above, stopping the update of the received input data includes: storing the last input data before receiving the protection-execution signal; recording the interface signal before receiving the protection-execution signal; and not receiving the acknowledgement signal to enable the trigger-event controller not to output a trigger signal to the digital-to-analog conversion interface controller.

BRIEF DESCRIPTION OF THE DRAWINGS

The disclosure can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the disclosure.

DETAILED DESCRIPTION OF THE DISCLOSURE

Certain words are used to refer to specific elements in the specification and the claims. Those with ordinary knowledge in the technical field should understand that hardware manufacturers may use different terms to refer to the same component. The specification and the claims of the present invention do not use differences in names as a way to distinguish elements, but use differences in functions of elements as a criterion for distinguishing. The "comprise" and "include" mentioned in the entire specification and the claims are open-ended terms, so they should be interpreted as "including but not limited to". "Generally" means that within an acceptable error range, a person with ordinary knowledge in the technical field can solve the technical problem within a certain error range, and basically achieve the technical effect. In addition, the term "coupled" herein includes any direct and indirect electrical connection means. Therefore, if it is described in the text that a first device is coupled to a second device, it means that the first device can be directly electrically connected to the second device, or indirectly electrically connected to the second device through other devices or connecting means. The following descriptions are preferred ways to implement the present invention. The purpose is to illustrate the spirit of the present invention and not to limit the scope of protection of the present invention.

The following description is the best embodiment expected of the present invention. These descriptions are used to illustrate the general principles of the present invention and should not be used to limit the present invention. The protection scope of the present invention should be determined on the basis of referring to the scope of the claims of the present invention.

Figure 1:
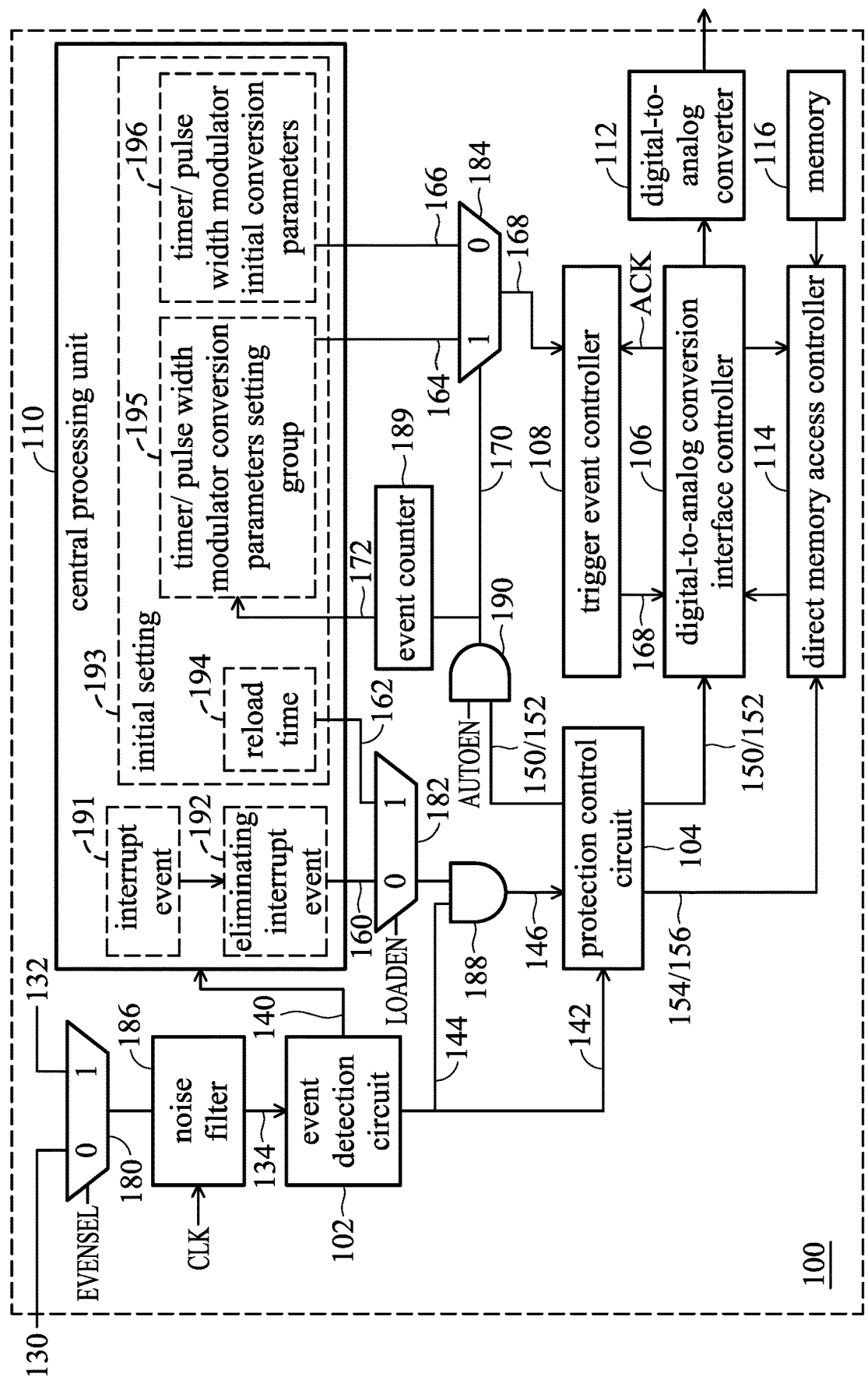
FIG. 1 is a schematic diagram of a microcontroller 100 in accordance with some embodiments of the present invention.

FIG. 1 is a schematic diagram of a microcontroller 100 in accordance with some embodiments of the present invention. As shown in FIG. 1, the microcontroller 100 includes an event-detection circuit 102, a protection-control circuit 104, a digital-to-analog conversion interface controller 106, a trigger-event controller 108, a central processing unit 110, a digital-to-analog converter 112, a direct memory access controller 114, a memory 116, a multiplexer 180, a multiplexer 182, a multiplexer 184, a noise filter 186, an AND gate 188, an AND gate 190, and an event counter 189.

In some embodiments, the event-detection circuit 102 detects a sudden event 134, correspondingly outputs an interrupt notification 140 to the central processing unit 110, and correspondingly outputs a protection-enable signal 142 to the protection-control circuit 104 according to the sudden event 134. In some embodiments, the sudden event 134 may be an external event 130 or an internal event 132. For example, the external event 130 may be a sudden event when the microcontroller 100 suffers an external physical attack. The internal event 132 may be, for example, an event in which the clock drift exceeds the allowable range, an event in which a memory (such as the memory 116) has a parity error, an event in which a system is reset due to a low voltage, or an event generated by peripheral circuits such as a comparator, a timer, and a pulse width modulator.

The multiplexer 180 receives the external event 130 or the internal event 132 according to a selection signal EVENSEL. For example, when the selection signal EVENSEL is at a logic low level (for example, "0"), the multiplexer 180 allows the external event 130 to pass through, so that the external event 130 passes through the noise filter 186 and becomes a sudden event 134. In contrast, when the selection signal EVENSEL is at a logic high level (for example, "1"), the multiplexer 180 allows the internal event 132 to pass through, so that the internal event 132 passes through the noise filter 186 and becomes a sudden event 134.

In some embodiments, the noise filter 186 may be, for example, a digital filter including three flip-flops in series, driven by a clock signal CLK, but the present invention is not limited thereto. In other words, the noise filter 186 may filter out sudden events whose data length is less than three clock cycles, and only let sudden events whose data length is greater than or equal to three clock cycles pass.

In some embodiments, the event-detection circuit 102 may detect the sudden event 134 by detecting the rising edge or the falling edge of the signal, but the present invention is not limited thereto. The protection-control circuit 104 receives the protection-enable signal 142 from the event-detection circuit 102, and correspondingly outputs a protection-execution signal 150 to the digital-to-analog conversion interface controller 106, and correspondingly outputs the protection-execution signal 150 to the AND gate 190. The digital-to-analog conversion interface controller 106 receives the protection-execution signal 150, stops updating the received input data, and stops outputting the acknowledgement signal ACK to the trigger-event controller 108, so that the digital-to-analog converter 112 suspends the signal conversion operation.

Generally, only when the trigger-event controller 108 receives the acknowledgement signal ACK, the trigger-event controller 108 will set or update the conversion parameters of the digital-to-analog conversion interface controller 106. Therefore, when the digital-to-analog conversion interface controller 106 receives the protection-execution signal 150 and stops outputting the acknowledgement signal ACK to the trigger-event controller 108, the trigger-event controller 108 does not output a trigger signal 168 to the digital-to-analog conversion interface controller 106. That is, the trigger-event controller 108 determines whether to set the conversion parameters of the digital-to-analog conversion interface controller 106 according to the acknowledgement signal ACK.

In some embodiments, when the digital-to-analog conversion interface controller 106 receives the protection-execution signal 150 and stops updating the received input data, the digital-to-analog conversion interface controller 106 further stores the last input data before receiving the protection-execution signal 150, and records the interface signal before receiving the protection-execution signal 150, so that the input interface signal required for the digital-to-analog conversion maintains the original level to avoid leakage current. Then, the digital-to-analog conversion interface controller 106 automatically turns off the clock required by the digital circuit.

In some embodiments, the direct memory access controller 114 reads the required input data from the memory 116, and outputs the required input data to the digital-to-analog conversion interface controller 106. The memory 116 may be an SRAM, for example, but the present invention is not limited thereto. When the protection-control circuit 104 receives the protection-enable signal 142, the protection-control circuit 104 outputs a control signal 154 to the direct memory access controller 114, so that the direct memory access controller 114 suspends the transfer of the required input data from the memory 116 to the digital-to-analog conversion interface controller 106.

In detail, when the direct memory access controller 114 receives the control signal 154, the direct memory access controller 114 turns off the clock signal corresponding to the DMA trigger source, and blocks the trigger demand of the direct memory access controller 114. Therefore, the transfer of the input data to the digital-to-analog conversion interface controller 106 is suspended. In some embodiments, if the input data is transported halfway and the direct memory access controller 114 receives the control signal 154 (that is, when a sudden event occurs), the data will not complete the digital-to-analog conversion at the moment. It is necessary to wait for the sudden event to be resolved before being transported by the direct memory access controller 114 again.

After receiving the interrupt notification 140 from the event-detection circuit 102, the central processing unit 110 generates an interrupt event 191 corresponding to the sudden event 134, and the central processing unit 110 resolves the interrupt event 191 associated with the sudden event 134, and eliminates the interrupt event 191 (that is, the block 192 in FIG. 1). At this time, the central processing unit 110 may correspondingly output an indication signal 160 to the multiplexer 182.

When the resources of the central processing unit 110 have priority considerations, and the central processing unit 110 is inconvenient to directly process the interrupt event 191 associated with the sudden event 134, the central processing unit 110 may directly determine that the sudden event 134 has been resolved after a preset time has elapsed according to the setting of the reload time 194 (for example, setting the reload time 194 as a preset time) in its initial setting 193. After the preset time, the central processing unit 110 correspondingly outputs an indication signal 162 to the multiplexer 182.

The multiplexer 182 receives the indication signal 160 or the indication signal 162 according to a selection signal LOADEN. For example, when the selection signal LOADEN is at a logic low level (for example, "0"), the multiplexer 182 passes the indication signal 160 so that the indication signal 160 is output to the AND gate 188. When the selection signal LOADEN is at a logic high level (for example, "1"), the multiplexer 182 passes the indication signal 162 so that the indication signal 162 is output to the AND gate 188.

In some embodiments, when the protection-control circuit 104 receives the protection-enable signal 142 from the event-detection circuit 102, the protection-control circuit 104 correspondingly outputs a protection-execution signal 150 to the AND gate 190. When an automatic switching function corresponding to the conversion parameters in the central processing unit 110 is turned on: That is, the enable signal AUTOEN is at a logic high level (for example, "1"), and the protection-execution signal 150 is also at a logic high level (for example, "1"), the central processing unit 110 outputs the conversion parameters to the trigger-event controller 108.

In detail, when the enable signal AUTOEN is at a logic high level (for example, "1"), and the protection-execution signal 150 is also at a logic high level (for example, "1"), the AND gate 190 outputs a selection signal 170 which is also at a logic high level. The event counter 189 counts the selection signal 170. In the initial setting 193 of the central processing unit 110, the timer/pulse width modulator (PWM) conversion parameter setting group 195 records conversion parameters corresponding to different count values. Generally, the timer/pulse width modulator (PWM) conversion parameter setting group is stored in a buffer, but the present invention is not limited thereto.

For example, when the count value of the event counter 189 is 1 (corresponding to the event-detection circuit 102 detecting one sudden event 134), the central processing unit 110 selects the first set of conversion parameters in the timer/pulse width modulator conversion parameter setting group 195 according to a selection signal 172. When the count value of the event counter 189 is 2 (corresponding to the event-detection circuit 102 detecting two sudden events 134), the central processing unit 110 selects the second set of conversion parameters in the timer/pulse width modulator conversion parameter setting group 195 according to the selection signal 172, and so on. At this time, the central processing unit 110 correspondingly outputs the data signal 164 associated with the selected conversion parameters to the multiplexer 184.

In some embodiments, the conversion parameters include the trigger period of the trigger event of the peripheral circuit. The peripheral circuit may be, for example, a timer, a pulse width modulator, and a comparator, but the present invention is not limited thereto. In some embodiments, the central processing unit 110 may set the timer/pulse width-modulator initial-conversion parameter 196, and correspondingly output the data signal 166 associated with the initial-conversion parameter to the multiplexer 184.

The multiplexer 184 receives the data signal 164 or the data signal 166 according to the selection signal 170. For example, when the selection signal 170 is at the logic high level, the multiplexer 184 passes the data signal 164, so that the multiplexer 184 outputs the trigger signal 168 carrying information of the selected conversion parameters (from the timer/pulse width modulator conversion parameter setting group 195) to the trigger-event controller 108. When the selection signal 170 is at the logic low level, the multiplexer 184 passes the data signal 166, so that the multiplexer 184 outputs the trigger signal 168 carrying information of the initial-conversion parameters (from the timer/pulse width-modulator initial-conversion parameter 196) to the trigger-event controller 108.

In some embodiments, the event-detection circuit 102 can not only detect the rising edge or the falling edge of the output signal of the noise filter 186 to determine whether the sudden event 134 has occurred, but also can determine whether the sudden event 134 has been resolved. When the event-detection circuit 102 detects that the sudden event 134 has been resolved, the event-detection circuit 102 correspondingly outputs a protection-disable signal 144 to the protection-control circuit 104. In the embodiment of FIG. 1, the event-detection circuit 102 outputs the protection-disable signal 144 to the AND gate 188.

Therefore, when the protection-control circuit 104 receives the protection-disable signal 144 (that is, the protection-disable signal 144 is at the logic high level, such as "1"), and the central processing unit 110 has eliminated the sudden event (that is, the indication signal 160 or the indication signal 162 is also at the logic high level, such as "1"): That is, the indication signal 146 is also at the logic high level, the protection-control circuit 104 correspondingly outputs a protection-stop signal 152 to the digital-to-analog conversion interface controller 106, and correspondingly outputs an inverted control signal 156 to the direct memory access controller 114, so that the digital-to-analog conversion interface controller 106 and the direct memory access controller 114 are restored to normal operation.

After the digital-to-analog conversion interface controller 106 receives the protection-stop signal 152 from the protection-control circuit 104, the digital-to-analog conversion interface controller 106 starts to update the received input data and starts to output the acknowledgement signal ACK. The trigger-event controller 108 is thus able to output the trigger signal 168 to the digital-to-analog conversion interface controller 106 for updating the received input data. After that, the digital-to-analog conversion interface controller 106 outputs the updated input data to the digital-to-analog converter 112 for performing digital-to-analog conversion. After the direct memory access controller 114 receives the inverted control signal 156 from the protection-control circuit 104, the direct memory access controller 114 starts to transfer the required input data from the memory 116 to the digital-to-analog conversion interface controller 106.

In some embodiments, when the protection-control circuit 104 receives the protection-disable signal 144, and the central processing unit 110 has eliminated the sudden event: That is, the indication signal 146 is also at a logic high level, the protection-control circuit 104 correspondingly outputs the protection-stop signal 152 to the AND gate 190. In this case, since the protection-stop signal 152 is at the logic low level, regardless of whether the enable signal AUTOEN is at the logic high level or the logic low level, the selection signal 170 will be at the logic low level, the central processing unit 110 outputs the trigger signal 168 carrying information of the initial-conversion parameters (from the timer/pulse width-modulator initial-conversion parameter 196) to the trigger-event controller 108. Then, after the trigger-event controller 108 receives the acknowledgement signal ACK, the trigger-event controller 108 outputs the trigger signal 168 carrying information of the initial-conversion parameters to the digital-to-analog conversion interface controller 106 to initialize the conversion parameters.

Figure 2:
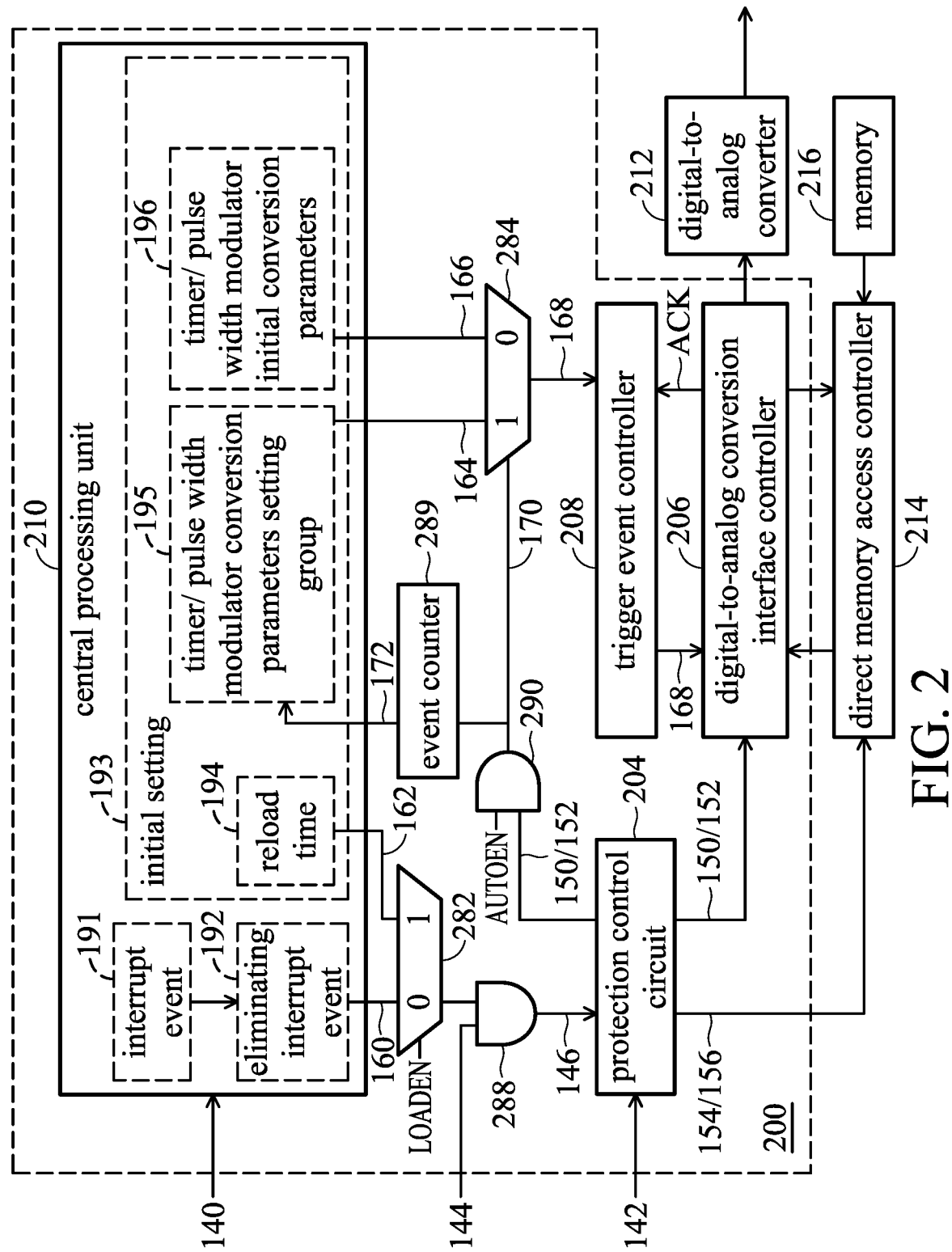
FIG. 2 is a schematic diagram of a protection circuit 200 in accordance with some embodiments of the present invention.

FIG. 2 is a schematic diagram of a protection circuit 200 in accordance with some embodiments of the present invention. As shown in FIG. 2, the protection circuit 200 includes a protection-control circuit 204, a digital-to-analog conversion interface controller 206, a trigger-event controller 208, a central processing unit 210, a multiplexer 282, a multiplexer 284, an AND gate 288, an AND gate 290, and an event counter 289. The protection-control circuit 204 receives a protection-enable signal 142 associated with a sudden event (for example, the sudden event 134 in FIG. 1), and correspondingly outputs a protection-execution signal 150 to the digital-to-analog conversion interface controller 206 and the AND gate 290. In some embodiments, the protection-enable signal 142 may be output after the event-detection circuit 102 in FIG. 1 detects the sudden event 134, but the present invention is not limited thereto.

The digital-to-analog conversion interface controller 206 receives the protection-execution signal 150, stops updating the received input data, and stops outputting the acknowledgement signal ACK to the trigger-event controller 208, so that the digital-to-analog converter 212 electrically connected to the digital-to-analog conversion interface controller 206 suspends the signal conversion operation. Generally only when the trigger-event controller 208 receives the acknowledgement signal ACK, the trigger-event controller 208 will set or update the conversion parameters of the digital-to-analog conversion interface controller 206.

Therefore, when the digital-to-analog conversion interface controller 206 receives the protection-execution signal 150 and stops outputting the acknowledgement signal ACK to the trigger-event controller 208, the trigger-event controller 208 does not output a trigger signal 168 to the digital-to-analog conversion interface controller 206. That is, the trigger-event controller 208 determines whether to set the conversion parameters of the digital-to-analog conversion interface controller 206 according to the acknowledgement signal ACK.

In some embodiments, when the digital-to-analog conversion interface controller 206 receives the protection-execution signal 150 and stops updating the received input data, the digital-to-analog conversion interface controller 206 further stores the last input data before receiving the protection-execution signal 150, and records the interface signal before receiving the protection-execution signal 150, so that the input interface signal required for the digital-to-analog conversion maintains the original level to avoid leakage current. Then, the digital-to-analog conversion interface controller 206 automatically turns off the clock required by the digital circuit.

In some embodiments, a direct memory access controller 214 is electrically connected to the digital-to-analog conversion interface controller 206 and the protection-control circuit 204. The direct memory access controller 214 reads the required input data from a memory 216, and outputs the required input data to the digital-to-analog conversion interface controller 206. The memory 216 may be an SRAM, for example, but the present invention is not limited thereto. When the protection-control circuit 204 receives the protection-enable signal 142, the protection-control circuit 204 outputs a control signal 154 to the direct memory access controller 214, so that the direct memory access controller 214 suspends the transfer of the required input data from the memory 216 to the digital-to-analog conversion interface controller 206.

In detail, when the direct memory access controller 214 receives the control signal 154, the direct memory access controller 214 turns off the clock signal corresponding to the DMA trigger source, and blocks the trigger demand of the direct memory access controller 214. Therefore, the transfer of the input data to the digital-to-analog conversion interface controller 206 is suspended. In some embodiments, if the input data is transported halfway and the direct memory access controller 214 receives the control signal 154 (that is, when a sudden event occurs), the data will not complete the digital-to-analog conversion at the moment. It is necessary to wait for the sudden event to be resolved before being transported by the direct memory access controller 214 again.

The central processing unit 210 in FIG. 2, for example, receive the interrupt notification 140 output from the event-detection circuit 102 in FIG. 1, generates an interrupt event 191 corresponding to the sudden event 134, resolves the interrupt event 191 associated with the sudden event 134, and eliminates the interrupt event 191 (for example, the block 192 in FIG. 2). At this time, the central processing unit 210 correspondingly outputs an indication signal 160 to the multiplexer 282.

When the resources of the central processing unit 210 have priority considerations, and the central processing unit 210 is inconvenient to directly process the interrupt event 191 associated with the sudden event 134, the central processing unit 210 may directly determine that the sudden event 134 has been resolved after a preset time has elapsed according to the setting of the reload time 194 (for example, setting the reload time 194 as a preset time) in its initial setting 193. After the preset time, the central processing unit 210 correspondingly outputs an indication signal 162 to the multiplexer 282.

The multiplexer 282 receives the indication signal 160 or the indication signal 162 according to a selection signal LOADEN. For example, when the selection signal LOADEN is at a logic low level (for example, "0"), the multiplexer 282 passes the indication signal 160 so that the indication signal 160 is output to the AND gate 288. When the selection signal LOADEN is at a logic high level (for example, "1"), the multiplexer 282 passes the indication signal 162 so that the indication signal 162 is output to the AND gate 288.

In some embodiments, when the protection-control circuit 204 receives the protection-enable signal 142 from the event-detection circuit 102 in FIG. 1, the protection-control circuit 204 correspondingly outputs a protection-execution signal 150 to the AND gate 290. When an automatic switching function corresponding to the conversion parameters in the central processing unit 210 is turned on: That is, the enable signal AUTOEN is at a logic high level (for example, "1"), and the protection-execution signal 150 is also at a logic high level (for example, "1"), the central processing unit 210 outputs the conversion parameters to the trigger-event controller 208.

In detail, when the enable signal AUTOEN is at a logic high level (for example, "1"), and the protection-execution signal 150 is also at a logic high level (for example, "1"), the AND gate 290 outputs a selection signal 170 which is also at a logic high level. The event counter 289 counts the selection signal 170. In the initial setting 193 of the central processing unit 210, the timer/pulse width modulator (PWM) conversion parameter setting group 195 records conversion parameters corresponding to different count values. Generally, the timer/pulse width modulator (PWM) conversion parameter setting group is stored in a buffer, but the present invention is not limited thereto.

For example, when the count value of the event counter 289 is 1 (corresponding to the event-detection circuit 102 detecting one sudden event 134), the central processing unit 210 selects the first set of conversion parameters in the timer/pulse width modulator conversion parameter setting group 195 according to a selection signal 172. When the count value of the event counter 289 is 2 (corresponding to the event-detection circuit 102 detecting two sudden events 134), the central processing unit 210 selects the second set of conversion parameters in the timer/pulse width modulator conversion parameter setting group 195 according to the selection signal 172, and so on. At this time, the central processing unit 210 correspondingly outputs the data signal 164 associated with the selected conversion parameters to the multiplexer 284.

In some embodiments, similarly, the conversion parameters in FIG. 2 include, for example, the trigger period of the trigger event of the peripheral circuit. The peripheral circuit may be, for example, a timer, a pulse width modulator, and a comparator, but the present invention is not limited thereto. In some embodiments, the central processing unit 210 may set the timer/pulse width-modulator initial-conversion parameter 196, and correspondingly output the data signal 166 associated with the initial-conversion parameters to the multiplexer 284.

The multiplexer 284 receives the data signal 164 or the data signal 166 according to the selection signal 170. For example, when the selection signal 170 is at the logic high level, the multiplexer 284 passes the data signal 164, so that the multiplexer 284 outputs the trigger signal 168 carrying information of the selected conversion parameters (from the timer/pulse width modulator conversion parameter setting group 195) to the trigger-event controller 208. When the selection signal 170 is at the logic low level, the multiplexer 284 passes the data signal 166, so that the multiplexer 284 outputs the trigger signal 168 carrying information of the initial-conversion parameters (from the timer/pulse width-modulator initial-conversion parameter 196) to the trigger-event controller 208.

In the embodiment of FIG. 2, when the event-detection circuit 102 in FIG. 1 detects that the sudden event 134 has been resolved, the event-detection circuit 102 in FIG. 1 correspondingly outputs a protection-disable signal 144 to the protection-control circuit 204. In the embodiment of FIG. 2, the AND gate 288 receives the protection-disable signal 144 output from the event-detection circuit 102 in FIG. 1. Therefore, when the protection-control circuit 204 receives the protection-disable signal 144 (that is, the protection-disable signal 144 is at the logic high level, such as "1"), and the central processing unit 210 has eliminated the sudden event (that is, the indication signal 160 or the indication signal 162 is also at the logic high level, such as "1"): That is, the indication signal 146 is also at the logic high level, the protection-control circuit 204 correspondingly outputs a protection-stop signal 152 to the digital-to-analog conversion interface controller 206, and correspondingly outputs an inverted control signal 156 to the direct memory access controller 214, so that the digital-to-analog conversion interface controller 206 and the direct memory access controller 214 are restored to normal operation.

After the digital-to-analog conversion interface controller 206 receives the protection-stop signal 152 from the protection-control circuit 204, the digital-to-analog conversion interface controller 206 starts to update the received input data and starts to output the acknowledgement signal ACK. The trigger-event controller 208 is thus able to output the trigger signal 168 to the digital-to-analog conversion interface controller 206 for updating the received input data. After that, the digital-to-analog conversion interface controller 206 outputs the updated input data to the digital-to-analog converter 212 for performing digital-to-analog conversion. After the direct memory access controller 214 receives the inverted control signal 156 from the protection-control circuit 204, the direct memory access controller 214 starts to transfer the required input data from the memory 216 to the digital-to-analog conversion interface controller 206.

In some embodiments, when the protection-control circuit 204 receives the protection-disable signal 144, and the central processing unit 210 has eliminated the sudden event: That is, the indication signal 146 is also at a logic high level, the protection-control circuit 204 correspondingly outputs the protection-stop signal 152 to the AND gate 290. In this case, since the protection-stop signal 152 is at the logic low level, regardless of whether the enable signal AUTOEN is at the logic high level or the logic low level, the selection signal 170 will be at the logic low level, the central processing unit 210 outputs the trigger signal 168 carrying information of the initial-conversion parameters (from the timer/pulse width-modulator initial-conversion parameter 196) to the trigger-event controller 208. Then, after the trigger-event controller 208 receives the acknowledgement signal ACK, the trigger-event controller 208 outputs the trigger signal 168 carrying information of the initial-conversion parameters to the digital-to-analog conversion interface controller 206 to initialize the conversion parameters.

Figure 3:
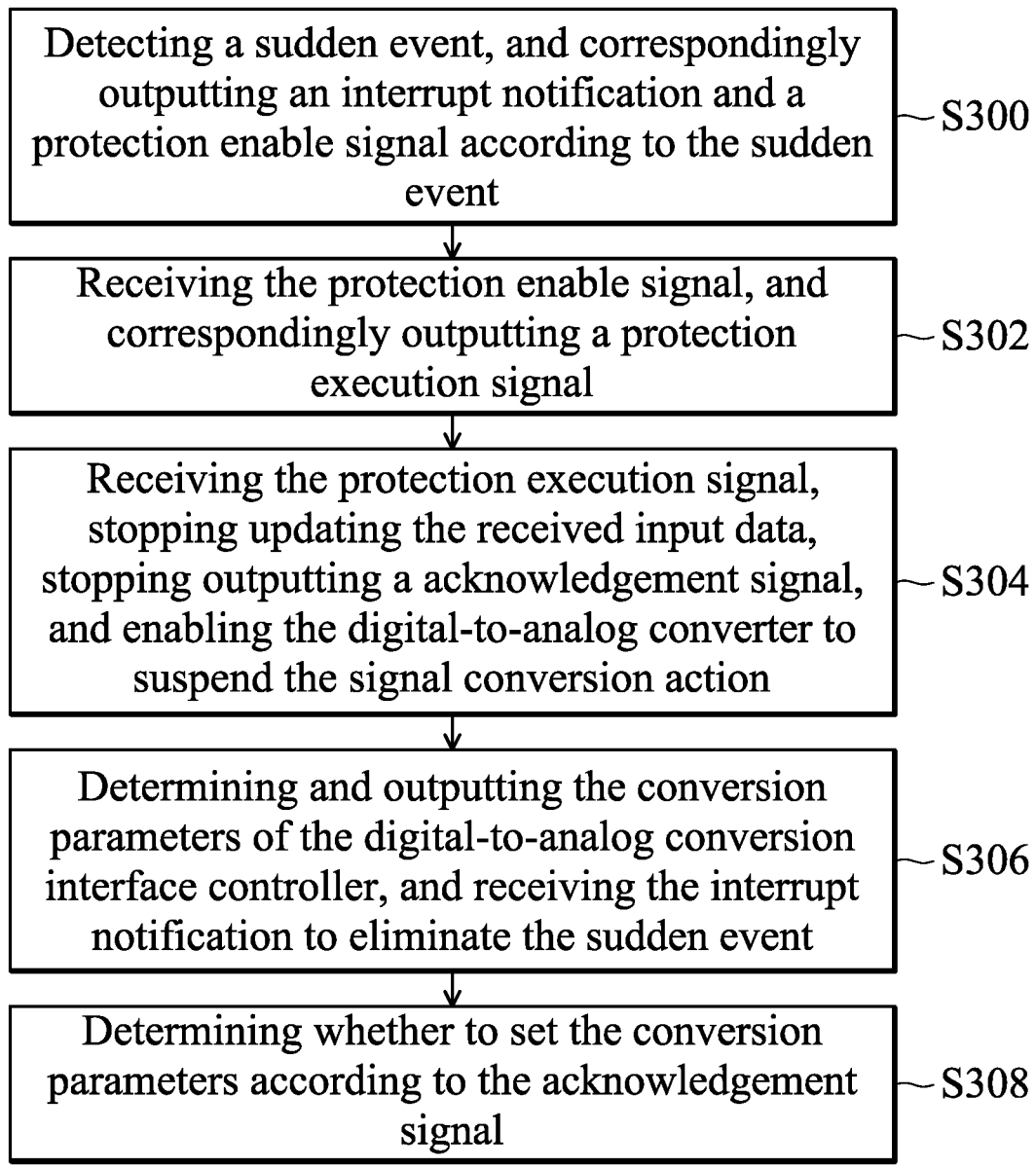
FIG. 3 is a flow chart of a protection method of a digital-to-analog converter in accordance with some embodiments of the present invention.

FIG. 3 is a flow chart of a protection method of a digital-to-analog converter in accordance with some embodiments of the present invention. The protection method in FIG. 3 is applicable to a microcontroller having an event-detection circuit, a protection-control circuit, a digital-to-analog conversion interface controller, a digital-to-analog converter, a trigger-event controller, and a central processing unit (for example, the microcontroller 100 in FIG. 1). The protection method of the present invention includes: detecting a sudden event, and correspondingly outputting an interrupt notification and a protection-enable signal according to the sudden event (step S300); receiving the protection-enable signal, and correspondingly outputting a protection-execution signal (step S302); receiving the protection-execution signal, stopping the update of the received input data, stopping the output of the acknowledgement signal, and enabling the digital-to-analog converter to suspend the signal conversion (step S304); determining and outputting the conversion parameters of the digital-to-analog conversion interface controller, and receiving the interrupt notification to eliminate the sudden event (step S306); and determining whether to set the conversion parameters according to the acknowledgement signal (step S308).

In some embodiments, step S300 is executed by the event-detection circuit 102 in FIG. 1. Step S302 is executed by the protection-control circuit 104 in FIG. 1 and the protection-control circuit 204 in FIG. 2. Step S304 is executed by the digital-to-analog conversion interface controller 106 in FIG. 1 and the digital-to-analog conversion interface controller 206 in FIG. 2. Step S306 is executed by the central processing unit 110 in FIG. 1 and the central processing unit 210 in FIG. 2. Step S308 is executed by the trigger-event controller 108 in FIG. 1 and the trigger-event controller 208 in FIG. 2.

In some embodiments, the protection method of the present invention further includes when the protection-control circuit 104 in FIG. 1 receives the protection-enable signal, the direct memory access controller 114 in FIG. 1 suspends the transfer of the required input data from the memory 116 to the digital-to-analog conversion interface controller 106. In step S306 of the protection method of the present invention, eliminating the sudden event includes: resolving the sudden event and clearing the interrupt notification; or determining that the sudden event has been eliminated directly after a preset time has elapsed.

In step S306 of the protection method of the present invention, when the protection-execution signal is received, and the automatic switching function of the central processing unit 110 corresponding to the conversion parameters is turned on, the conversion parameters are output to the trigger-event controller 108. In step S304 of the protection method of the present invention, stopping the update of the received input data includes: storing the last input data before receiving the protection-execution signal; recording the interface signal before receiving the protection-execution signal; and not receiving the acknowledgement signal to enable the trigger-event controller not to output a trigger signal 168 to the digital-to-analog conversion interface controller 106.

The microcontroller 100, the protection circuit 200, and the protection method of the present invention determine and control the work or pause of the digital-to-analog conversion interface through hardware detection, and automatically return to the working mode, automatically cut off or restore the power supply of each block to save power. In addition to being used as a hardware countermeasure to withstand sudden events, the present invention can also deliberately design hardware-triggered control events, so that when hardware countermeasures occur, the output of the digital-to-analog converter can be suspended. When the back-end load is used for motor control applications, the motor can be temporarily stopped to maintain system safety.

In the microcontroller 100, the protection circuit 200, and the protection method of the present invention, the external/internal sudden event is detected and the central processing unit is notified whether it is processed or not. If there is a consideration of the priority of the resources of the central processing unit, the hardware can be chosen to deal with this sudden event, and so that the resources of the central processing unit will not be occupied. The microcontroller 100, the protection circuit 200, and the protection method of the present invention can further utilize the interval during which the digital-to-analog converter stops updating the output, so that the hardware can automatically update the frequency of the trigger event of the digital-to-analog conversion. After the hardware trigger event is resolved, the digital-to-analog conversion can operate at the updated trigger frequency.

For a digital-to-analog converter that can latch the output voltage without changing the input interface signal, the automatic detection and protection mechanism of the present invention can temporarily keep the output of the digital-to-analog converter at a certain level, and automatically switch to the normal mode. The features of the present invention prevent back-end applications that require a reference digital-to-analog converter from causing immediate risks due to external physical attacks on the chip or sudden events triggered by the peripheral circuits of the chip.

In the several embodiments provided by the present invention, it should be understood that the disclosed system, device, and method can be implement in other methods. For example, the device embodiments described above are merely illustrative, for example, the division of units is only a logical function division, and there may be other divisions in actual implementation. For example, multiple units or elements can be combined or integrated into another system, or some features may be omitted or not implemented. In addition, the displayed or discussed mutual coupling or direct coupling or communicatively connecting may be indirect coupling or communicatively connecting through some interfaces, device or units, and may be in electrical, mechanical, or other forms.

In addition, the functional units in the various embodiments of the present invention may be integrated into one processing unit, or each unit may exist alone physically, or two or more units may be integrated into one unit. The above-mentioned integrated unit can be realized either in the form of hardware or in the form of software functional unit.

Although the present invention is disclosed above in the preferred embodiment, it is not intended to limit the scope of the present invention. Anyone with ordinary knowledge in the relevant technical field can make changes and modifications without departing from the spirit and scope of the present invention. Therefore, the protection scope of the present invention shall be determined by the scope of the claims.

What is claimed is:

1. A microcontroller, comprising:
    an event-detection circuit, detecting a sudden event, and correspondingly outputting an interrupt notification and a protection-enable signal according to the sudden event;
    a protection-control circuit, receiving the protection-enable signal, and correspondingly outputting a protection-execution signal;
    a digital-to-analog converter;
    a digital-to-analog conversion interface controller, receiving the protection-execution signal, stopping an update of received input data, stopping an output of an acknowledgement signal, and enabling the digital-to-analog converter to suspend a signal conversion;
    a trigger-event controller, determining whether to set conversion parameters of the digital-to-analog conversion interface controller according to the acknowledgement signal; and
    a central processing unit, determining the conversion parameters, outputting the conversion parameters to the trigger-event controller, and receiving the interrupt notification to eliminate the sudden event.

2. The microcontroller as claimed in claim 1, further comprising:
    a memory; and
    a direct memory access controller, reading required input data from the memory, and outputting the required input data to the digital-to-analog conversion interface controller;
    wherein when the protection-control circuit receives the protection-enable signal, the protection-control circuit outputs a control signal to the direct memory access controller, so that the direct memory access controller suspends a transfer of the required input data from the memory to the digital-to-analog conversion interface controller.

3. The microcontroller as claimed in claim 2, wherein the central processing unit eliminates the sudden event, comprising:
    resolving the sudden event and clearing the interrupt notification; or
    determining that the sudden event has been eliminated directly after a preset time has elapsed.

4. The microcontroller as claimed in claim 3, wherein when the event-detection circuit detects that the sudden event has been resolved, the event-detection circuit correspondingly outputs a protection-disable signal to the protection-control circuit.

5. The microcontroller as claimed in claim 4, wherein when the protection-control circuit receives the protection-disable signal, and the central processing unit has eliminated the sudden event, the protection-control circuit correspondingly outputs a protection-stop signal to the digital-to-analog conversion interface controller, and correspondingly outputs an inverted control signal to the direct memory access controller, so that the digital-to-analog conversion interface controller and the direct memory access controller are restored to normal operation.

6. The microcontroller as claimed in claim 1, wherein when the central processing unit receives the protection-execution signal from the protection-control circuit, and an automatic switching function of the central processing unit corresponding to the conversion parameters is turned on, the central processing unit outputs the conversion parameters to the trigger-event controller.

7. The microcontroller as claimed in claim 1, wherein the conversion parameters comprise a trigger period of a trigger event of a peripheral circuit.

8. The microcontroller as claimed in claim 1, wherein the digital-to-analog conversion interface controller stops updating the received input data, comprising:
   storing last input data before receiving the protection-execution signal;
   recording an interface signal before receiving the protection-execution signal; and
   not receiving the acknowledgement signal by the trigger-event controller to enable the trigger-event controller not to output a trigger signal to the digital-to-analog conversion interface controller.

9. A protection circuit to protect a digital-to-analog converter from interference from a sudden event, comprising:
   a protection-control circuit, receiving a protection-enable signal associated with the sudden event, and correspondingly outputting a protection-execution signal;
   a digital-to-analog conversion interface controller, receiving the protection-execution signal, stopping an update of received input data, stopping an output of an acknowledgement signal, and enabling the digital-to-analog converter to suspend a signal conversion;
   a trigger-event controller, determining whether to set conversion parameters of the digital-to-analog conversion interface controller according to the acknowledgement signal; and
   a central processing unit, determining the conversion parameters, outputting the conversion parameters to the trigger-event controller, and eliminating the sudden event.

10. The protection circuit as claimed in claim 9, wherein when the protection-control circuit receives the protection-enable signal, the protection-control circuit outputs a control signal to a direct memory access controller, so that the direct memory access controller suspends a transfer of required input data from a memory to the digital-to-analog conversion interface controller.

11. The protection circuit as claimed in claim 9, wherein the central processing unit eliminates the sudden event, comprising:
   resolving the sudden event and clearing an interrupt notification associated with the sudden event; or
   determining that the sudden event has been eliminated directly after a preset time has elapsed.

12. The protection circuit as claimed in claim 10, wherein when the protection-control circuit receives a protection-disable signal associated with the sudden event that has been resolved, and the central processing unit has eliminated the sudden event, the protection-control circuit correspondingly outputs a protection-stop signal to the digital-to-analog conversion interface controller, and correspondingly outputs an inverted control signal to the direct memory access controller, so that the digital-to-analog conversion interface controller and the direct memory access controller are restored to normal operation.

13. The protection circuit as claimed in claim 9, wherein when the central processing unit receives the protection-execution signal from the protection-control circuit, and an automatic switching function of the central processing unit corresponding to the conversion parameters is turned on, the central processing unit outputs the conversion parameters to the trigger-event controller.

14. The protection circuit as claimed in claim 9, wherein the conversion parameters comprise a trigger period of a trigger event of a peripheral circuit.

15. The protection circuit as claimed in claim 9, wherein the digital-to-analog conversion interface controller stops updating the received input data, comprising:
   storing last input data before receiving the protection-execution signal;
   recording an interface signal before receiving the protection-execution signal; and
   not receiving the acknowledgement signal by the trigger-event controller to enable the trigger-event controller not to output a trigger signal to the digital-to-analog conversion interface controller.

16. A protection method for a digital-to-analog converter, which is suitable for a microcontroller having an event-detection circuit, a protection-control circuit, a digital-to-analog conversion interface controller, a digital-to-analog converter, a trigger-event controller, and a central processing unit, comprising:
   detecting a sudden event, and correspondingly outputting an interrupt notification and a protection-enable signal according to the sudden event;
   receiving the protection-enable signal, and correspondingly outputting a protection-execution signal;
   receiving the protection-execution signal, stopping an update of received input data, stopping an output of an acknowledgement signal, and enabling the digital-to-analog converter to suspend a signal conversion;
   determining and outputting conversion parameters of the digital-to-analog conversion interface controller, and receiving the interrupt notification to eliminate the sudden event; and
   determining whether to set the conversion parameters according to the acknowledgement signal.

17. The protection method as claimed in claim 16, wherein when the protection-enable signal is received, a transfer of required input data from a memory to the digital-to-analog conversion interface controller is suspended.

18. The protection method as claimed in claim 16, wherein eliminating the sudden event comprises:
   resolving the sudden event and clearing the interrupt notification; or
   determining that the sudden event has been eliminated directly after a preset time has elapsed.

19. The protection method as claimed in claim 16, wherein when the protection-execution signal is received, and an automatic switching function of the central processing unit corresponding to the conversion parameters is turned on, the conversion parameters are output to the trigger-event controller.

20. The protection method as claimed in claim 16, wherein stopping the update of the received input data comprises:
   storing last input data before receiving the protection-execution signal;
   recording an interface signal before receiving the protection-execution signal; and
   not receiving the acknowledgement signal to enable the trigger-event controller not to output a trigger signal to the digital-to-analog conversion interface controller.

\* \* \* \* \*